United States Patent [19]

Fakirov et al.

[11] Patent Number: 4,575,470

[45] Date of Patent: Mar. 11, 1986

[54] CHEMICALLY BONDED POLYOLEFIN LAMINATES

[75] Inventors: Stoyko C. Fakirov, Sofia, Bulgaria; I-Hwa Lee, Wilmington; Jerold M. Schultz, Newark, both of Del.

[73] Assignee: University of Delaware, Newark, Del.

[21] Appl. No.: 553,103

[22] Filed: Nov. 18, 1983

[51] Int. Cl.$^4$ .................... B32B 5/12; B32B 27/08
[52] U.S. Cl. .................... 428/105; 428/420; 428/516; 428/910; 156/307.1; 156/308.2
[58] Field of Search .............. 428/420, 516, 910; 156/307.1, 308.2, 105

[56] References Cited

U.S. PATENT DOCUMENTS 3,242,140 3/1966 Hoover ........................ 428/420
3,475,245 10/1969 Bearer ........................ 428/420
4,127,688 11/1978 Bieler et al. .................. 428/420
4,359,499 11/1982 Akao et al. ................. 428/910 X

*Primary Examiner*—Patricia C. Ives
*Attorney, Agent, or Firm*—John A. Parkins

[57] ABSTRACT

The present invention relates to laminates of polyolefin laminae and strips chemically bonded in the solid state by reactions initiated by cross-linking catalysts interspersed at the interface of contacting laminae. Catalysts to initiate crosslinking reactions at temperatures below the melting point of the respective laminae are employed. A preferred application of the laminate is a chemically bonded structure of highly oriented, preferably uniaxially oriented film with the direction of orientation of uniaxial orientation at an angle to each other in successive laminae.

5 Claims, No Drawings

CHEMICALLY BONDED POLYOLEFIN LAMINATES

The Government of the Unites States of America has certain rights to this invention pursuant to Army Research Office Research Grant No. DAAG29-81-K-0119.

BACKGROUND OF THE INVENTION

The present invention is related to co-pending United States patent application Ser. No. 06/553,106 filed on the same date as the present application with two common inventors and a common assignee. Said application, incorporated herein by reference, relates to chemical bonded laminates generally, with condensation polymer laminae species. The present application relates to addition polymer species.

As with interfacially bonded laminates of oriented condensation polymer films, sheets or strips of oriented addition polymer films and the like suffer from deficiencies in bonding which have hampered exploitation of attractive properties. A generality pertaining to oriented films is that the greater the degree of orientation in one direction to impart high levels of mechanical properties, such as tensile strength, the lower the level of properties in the transverse direction. In uniaxially oriented film both tensile strength and elongation before break in the direction transverse to orientation can be so low that in ordinary processing or manipulation the film fibrillates, rendering it useless for some applications which could otherwise employ its high tensile strength.

High tensile strengths typical for in uniaxially oriented film are unattainable in biaxially oriented film; so attempts have been made to fabricate cross-lapped, interfacially bonded, laminar structures with the direction of orientation at an angle to each other in successive laminae or layers to thus capitalize on the very high tensile strength of uniaxial films. In the common methods of bonding, adhesives have been less than totally suitable and fusion bonding destroys or excessively diminishes orientation, defeating the purpose of orientation to produce a high level of mechanical properties.

The present invention is directed to a type of bonding minimizing some of these deficiencies.

SUMMARY OF THE INVENTION

It is, therefore, an object of the present invention to provide a laminate of oriented addition polymer films and strips with a durable interfacial bond between laminae which does not significantly affect orientation of the laminae.

It is a further object of the present invention to provide chemically bonded laminates of polyolefin films.

These and other objects are achieved by interspersing catalysts for crosslinking between two contacting laminae or sheets, urging the sheets into intimate contact by application of pressure and heating the laminate to a temperature effective to activate crosslinking of the polymer chains in the presence of the catalyst, but below the melting point of the laminae.

DETAILED DESCRIPTION

Essential material included in the incorporated co-pending U.S. application comprises a disclosure of the requirements for forming chemical bonds and means for meeting these requirements. Chemically bonded laminate structures in general are disclosed with specific structures of condensation polymer laminae.

The requirements for chemical bonding in the co-pending U.S. patent application which are applicable to the present invention include:

(1) The surfaces to be bonded must be brought into very intimate contact, perferably under pressure; and (2) The contacting surfaces must be subjected to conditions for chemical reaction between molecular species of each surface.

Specific means to meet these requirements applicable primarily to condensation polymers are also disclosed. These include a thermally-induced reaction related to post-condensation employed in solid phase polymerization of condensation polymers, interposition of coupling agents for condensates into the interface and interposition of catalysts such as ester interchange or condesnsation catalysts into the interface. As such, these means are not directly applicable to the present invention. These means in general are dependent upon reactions with chemically active or activatable groups present on the constituent molecular chains. In the present invention crosslinking catalysts have been found to develop sites for interfacial chemical bonding.

Catalyst-initiated crosslinking reactions of polyolefins are well known, but these are usually associated with the polymer in the bulk, and generally, except for radiation-induced reactions, are in the molten state where probable reaction sites are mobile and can be within the necessary proximity to form a chemical bond between chains. For example, U.S. Pat. No. 4,395,459 discloses the use of crosslinking catalysts in polyolefins effective to initiate such reactions at a temperature above the melting point of the polymer in order to allow formation of the film in the molten state with subsequent heating of the formed film in a laminate to create relatively rigid, cross-linked structures with fusion bonding of laminae. One of the objectives of that patent is to effect cross linking through the bulk of the polymer, with no concern for molecular orientation, which, if present, would doubtless be lost in melting.

In the prior art there is little reason to believe that chemical bonding reactions could occur in the solid phase across an interface between separate bodies. If such a reaction could occur with crosslinking catalysts on the surface only, it is probable that only an extremely thin layer where the catalyst is present which could be crosslinked, with the bulk of the structure remaining essentially uncrosslinked and flexible.

Catalysts for crosslinking in the present invention are those which are effective below the melting temperature of the polymer constituting laminae, preferably organic peroxides and azo compounds. These are preferably on surfaces to be bonded, dispersed in solution from which the solvent can be evaporated before contacting the surfaces. Representative polymers are polyethylene, polypropylene and copolymers comprising polyethylene and polypropylene, both block and random.

EXAMPLE 1

To illustrate the formation of chemical bonds across an interface between sheets by the action of crosslinking catalysts, sheets of pure polypropylene were employed. (These sheets were oriented film). Two peroxide crosslinking catalysts, dicumyl peroxide (DCP) and benzoyl peroxide (BP) in solvents were used. Dispersion difficulties made tests with solid DCP inconclusive.

Film sheets of uniaxially oriented polypropylene, m.p. 177° C., for bonding were dipped into a solvent with a quantity of the peroxide dissolved therein to provide a concentration of approximately 5%. The sheets were hung to evaporate the solvent, leaving the peroxide distributed over the surface. The sheets were placed in contact with the direction of orientation at an angle of 90° and pressed in a hydraulic press with platens at a nominal temperature of 150° C.

Dicumyl Peroxide (DCP). A set of samples was prepared with DCP in acetone (approx. 5% solv.) and pressed at 150±1° C. and 8000 psi.

Benzoyl Peroxide (BP). A set of samples was prepared with BP in acetone (approx. 5%) and pressed at 149±2° C. and 8000 psi.

Control Example. Samples of film as above but without a crosslinking catalyst were prepared and pressed at 150±4° C., 8000 psi.

Testing. A measure of the adhesive force between the film plies was by using the test method ASTM D1893-67. Basically, this method employs a rod supported on a frame with the rod drawn parallel to the interface of the sheets to separate the bonded portions. The force to draw the rod through the bonded interface is determined, from this force per unit of width can be calculated.

The results of the tests are shown in Table I:

TABLE 1

| CATALYST | TEMP. °C. | PRESSURE (psi) | FORCE (g/mm) |
|---|---|---|---|
| DCP | 150 | 8000 | 0.82 |
| BP | 149 | 8000 | 0.66 |
| None | 150 | 8000 | 0 |

EXAMPLE 2

The bonding process was applied to a series of samples of uniaxially oriented film to show the effect of bonding at a lower temperature and to show the relative effect of bonding of substantially pure polypropylene film, and a copolymer of 85% polypropylene and 15% polyethylene, in Table II. Duplicate samples of polypropylene and triplicate samples of the copolymer were employed with a 5% solution of benzoyl peroxide in acetone applied as in Example 1 to a short portion of the sample which was overlapped for bonding. These samples after, the solvent had evaporated, along with an untreated control were urged into contact at 8000 psi in a hydraulic press with heated platens and heated to 99° C. for 1 hour. Results are summarized in Table II.

TABLE II

| Sample | Force to delaminate (g/mm) |
|---|---|
| Polypropylene | 0.40 |
| Polypropylene | 0.34 — Average = 0.37 |
| Copolymer | 2.07 |
| Copolymer | 2.34 |
| Copolymer | 2.47 — Average = 2.29 |
| Control | 0 |

(Note)
The bond failed before film breakage in all cases; semiquantitative (manual) tests indicated the films remained flexible and had good retention of orientation in film after bonding.

Example 2 shows bonding of polypropylene at temperature substantially lower than Example 1, and much better bonding of the copolymer.

The foregoing examples illustrate chemical bonding of polyolefins in the solid state initiated by crosslinking catalysts. It is to be understood, that in practice, as is known, such catalysts would not be used in polypropylene-containing polymers without the use of coagents to inhibit molecular chain degradation which would occur. In these examples which were conducted without such agents some degradation might have occurred at the interface, but so superficially as not to mask the bonding which occurred. Representative coagents as are known to the art are quinones, pentaerythritol triallyl ether and, in general, polyfunctional monomers with double bonds.

The utility of the present invention is somewhat as in the copending application. The invention can be applied to bonding those structures with surfaces which afford the intimate contact required. These include films, sheets, rods, pipes, blocks, tubes and fabricated structures such as rib-reinforced structures. Pipe and cable wrap with cross-lapped uniaxially oriented straps are adapted to production by this method. Microwave transparent armor for radar antennas utilize tough structures prepared by this method from lapped highly oriented film.

We claim:

1. A chemically bonded laminate of crosslapped laminae formed from uniaxially oriented polyolefin film laminae wherein the direction of orientation of adjacent contacting polyolefin laminae is substantially at a right angle, said laminate bonded by the action of organic peroxide crosslinking catalyst to create crosslinking sites while the laminate is held between platens under mechanical pressure during heating to a temperature below its melting point.

2. A process for production of a structure comprising a lamination of substantially unixally oriented polyolefin addition polymer laminae having chemical bonds between polymer molecules of the laminae at the interface of contacting laminae, said process comprising the steps of:

bringing the surfaces of the laminae into contact with the directions of orientation of successive laminae at an angle to each other to form a laminate:

urging the surfaces into intimate contact between heated platens with pressure:

interposing a crosslinking catalyst effective to initiate crosslinking sites for reactions at a temperature below the melting point of the polymer laminae into the interface of contacting surfaces;

maintaining pressure by the platens on the laminate and heating it to a temperature sufficient to initiate crosslinking reactions but below the melting point of the polymer.

3. In a process for production of bonded laminations of uniaxially oriented polyolefin film laminae by reaction at contacting surfaces of adjacent polyolefin laminae induced by organic peroxides and heat wherein said surfaces are urged into contact by mechanical pressure, the improvement comprising:

positioning the uniaxially oriented film laminae with the direction of orientation of adjacent laminae substantially at an angle to each other; and maintaining the lamination under mechanical pressure between platens while heating the lamination to a temperature below its melting point to effect chemical bonding while substantially maintaining the orientation of each lamina.

4. The process of claim 3 in which the polyolefin is selected from the group consisting of polyethylene, polypropylene, and copolymers containing polyethylene and copolymers containing polypropylene.

5. The process of claim 3 wherein the organic peroxide is selected from the group comprising benzoyl peroxide and dicumyl peroxide.

* * * * *